United States Patent
Soffer et al.

(10) Patent No.: US 9,203,770 B2
(45) Date of Patent: Dec. 1, 2015

(54) ENHANCED LINK AGGREGATION IN A COMMUNICATIONS SYSTEM

(71) Applicant: Broadcom Corporation, Irvine, CA (US)

(72) Inventors: Ran Soffer, Tel-Mond (IL); Alon Shavit, Kadima (IL)

(73) Assignee: Broadcom Corporation, Irvine, CA (US)

( * ) Notice: Subject to any disclaimer, the term of this patent is extended or adjusted under 35 U.S.C. 154(b) by 144 days.

(21) Appl. No.: 13/930,653

(22) Filed: Jun. 28, 2013

(65) Prior Publication Data

US 2015/0003466 A1    Jan. 1, 2015

(51) Int. Cl.
*H04L 12/28* (2006.01)
*H04L 12/801* (2013.01)
*H04L 12/803* (2013.01)

(52) U.S. Cl.
CPC .............. *H04L 47/34* (2013.01); *H04L 47/125* (2013.01)

(58) Field of Classification Search
None
See application file for complete search history.

(56) References Cited

U.S. PATENT DOCUMENTS

| 2007/0098006 | A1* | 5/2007 | Parry et al. | 370/437 |
| 2008/0056336 | A1* | 3/2008 | Toyoda et al. | 375/219 |
| 2011/0134752 | A1* | 6/2011 | Prestor et al. | 370/230.1 |
| 2012/0210416 | A1* | 8/2012 | Mihelich et al. | 726/11 |

* cited by examiner

*Primary Examiner* — Afshawn Towfighi
(74) *Attorney, Agent, or Firm* — Sterne, Kessler, Goldstein & Fox P.L.L.C.

(57) ABSTRACT

An enhanced link aggregation (ELAG) transmitter device, is provided. The ELAG transmitted device includes a packet interface configured to receive a plurality of data packets from a communication networking, and also includes a controller configured to segment and reschedule one or more data packets of the plurality of data packets and to add a sequence number to the one or more data packets. Additionally, the ELAG transmitter device includes a distributor configured to logically distribute the one or more segmented and rescheduled data packets across an aggregate link based on an actual available bandwidth of the aggregate link and in accordance with at least one of a packet based distribution scheme, a segmented packet distribution scheme, and a byte based distribution scheme.

21 Claims, 8 Drawing Sheets

ENHANCED LINK AGGREGATION IN A COMMUNICATIONS SYSTEM

BACKGROUND

1. Field of the Disclosure

The disclosure generally relates to communication links, and more specifically to systems and methods for efficiently aggregating the resources available in the communication links.

2. Related Art

Link aggregation is a computer networking term that is often used to describe various methods of combining (aggregating) multiple network connections in parallel to increase throughput beyond what a single connection could sustain. In other words, link aggregation is a method of logically bundling two or more physical links to form one logical link. The logical link ("aggregated link") can be considered to have the sum bandwidth, or a bandwidth close to the sum bandwidth, of the individual links that are bundled. The aggregated link may be considered as a single link by higher-layer protocols (e.g. network layer and above), thus facilitating data transfer at faster rates without the overhead of managing data transfer over separate physical links at the higher-layer protocols. In addition to providing an increased throughout, link aggregation also provides redundancy in case one of the bundled links fails.

Typically, link aggregation is implemented at the logical link control layer/media access control layer, which is formed in layer 2 of the Open System Interconnect (OSI) protocol stack. However, in some instances, it may be possible to implement link aggregation at any of the lowest three layers of the OSI protocol. Examples of link aggregation at layer 1 are power line (e.g. IEEE 1901) and wireless (e.g. IEEE 802.11) network devices that combine multiple frequency bands. Link aggregation at OSI layer 2 (data link layer, e.g. Ethernet frame in LANs or multi-link point-to-point protocol in WANs, Ethernet MAC address) typically occurs across switch ports, which can be either physical ports, or virtual ones managed by an operating system. Further, link aggregation may also be possible at layer 3 in the OSI protocol using round-robin scheduling, or using hash values computed from fields in the packet header, or a combination of these two methods.

Regardless of the layer on which link aggregation is implemented, the goal is the same—to increase throughput beyond what a single connection could sustain. Conventional link aggregation attempts to increase throughput by sequentially distributing a network load across all links. However, communication systems that implement conventional link aggregation suffer from several inherent problems, which can ultimately render these systems highly inefficient. For example, when packets of different sizes are transmitted across the various individual links, the communication system may be subjected to latency issues, because the total transmission will always be delayed by the longer packets. Similarly, when the latency associated with each of the individual links varies, the communication system may again be subjected to latency issues, because the total transmission will always be delayed by the slower links. These problems are compounded when the communication system is implemented over links having variable bandwidths (e.g. DSL, RF, cable). The problem gets even more complex when link aggregation (LAG) networking devices are indirectly connected to one another, (e.g. via Ethernet links to multiple MODEMs where each MODEM converts the traffic from Ethernet to non-Ethernet). In these instances, the bandwidth detected by a networking device within the communication system may not represent the actual bandwidth available across the non-Ethernet links. Therefore, without knowing the actual available bandwidth of the aggregated link, the networking device may be unable to properly distribute the network load across each of the links.

Each of these aforementioned issues prevents conventional link aggregation methods from being able to utilize 100% of the available bandwidth of the aggregated link, thus rendering these conventional methods, and their corresponding communication systems, highly inefficient.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
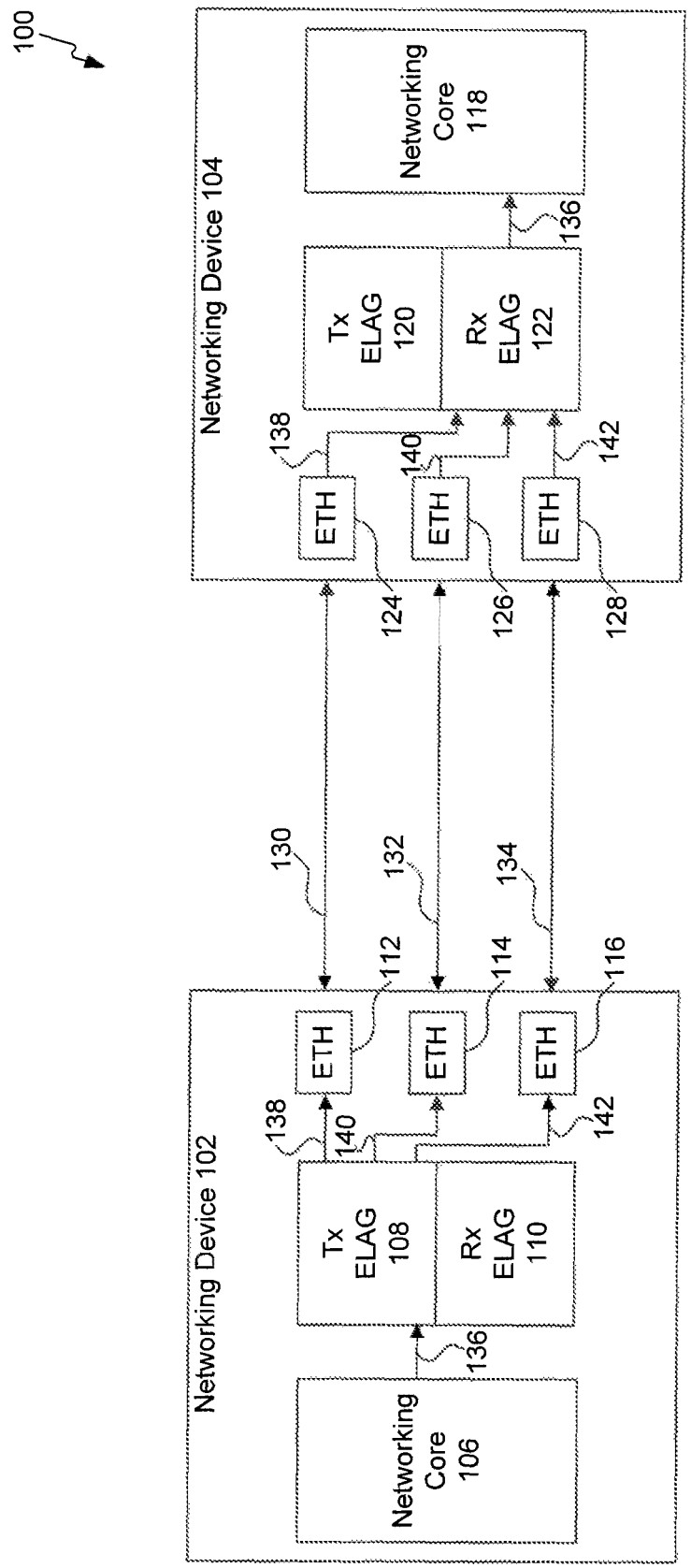
FIG. 1 illustrates a block diagram of a communication system implementing enhanced link aggregation (ELAG) over a direct connection according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Communication System Implementing ELAG

As previously discussed, link aggregation (LAG) describes various methods of combining (aggregating) multiple network connections in parallel to increase throughput (or bandwidth) beyond what a single connection could sustain. Thus, LAG may refer to a method of bundling two or more physical links to form a single logical link. The logical link ("aggregated link") can be considered to have the sum bandwidth, or a bandwidth close to the sum bandwidth, of the individual links that are bundled. In addition to providing an increased throughout, LAG also provides redundancy in case one of the bundled links fails.

Similar to LAG, enhanced link aggregation (ELAG) also refers to various methods of logically bundling two or more physical links to form a single logical link. However, unlike existing techniques, ELAG represents methods whereby approximately 100% of the available bandwidth of the aggregated link may be utilized. Even when the aggregation is performed over links that have variable bandwidth, minimal latency is added on top of the inherent link latency. Additionally, ELAG represents methods whereby utilization and latency advantages are maintained, even if the aggregation device is connected via fixed bandwidth (e.g. Ethernet) links to MODEMs that convert the link into a variable bandwidth (e.g. non-Ethernet) link. Accordingly, communication systems implementing ELAG may experience aggregated links having optimized throughputs, thus rendering these communication systems highly efficient. This is in contrast to the inherently inefficient conventional communication systems implementing LAG, which are merely able to utilize a portion of the available throughput of their aggregated links.

ELAG may be implemented in one of two different communication system configurations. In particular, ELAG may be implemented within direct connection communication systems (e.g. communication systems having Ethernet links), or within indirect connection communication systems (e.g. communication systems having non-Ethernet links). The following disclosure will present the relative advantages that ELAG provides to each of these configurations.

Although the description of the communication systems implementing ELAG are to be described in terms of Ethernet links, those skilled in the relevant art(s) will recognize that the present disclosure can be applicable to other architectures without departing from the spirit and scope of the present disclosure.

FIG. 1 illustrates a block diagram of a communication system 100 implementing enhanced link aggregation (ELAG) over a direct connection according to an exemplary embodiment of the present disclosure. Communication system 100 may be configured to facilitate both terrestrial point-to-point (PtP) radio communications, as well as point-to-multipoint communications, and can include both wired and/or wireless communications.

Communication system 100 includes networking devices 102 and 104. In some embodiments, networking devices 102 and 104 may each represent a switch or a router, to provide some examples.

Networking device 102 includes a networking core 106, an ELAG transmitter device 108, an ELAG receiver device 110, and multiple Ethernet interfaces 112, 114 and 116. Similarly, networking device 104 includes a networking core 118, an ELAG transmitter device 120, an ELAG receiver device 122, and multiple Ethernet interfaces 124, 126 and 128. Networking devices 102 and 104 may be directly connected to one another via multiple Ethernet links 130, 132 and 134. Although communication system 100 is illustrated as having three Ethernet links 130-134, those skilled in the relevant art(s) will recognize that the present disclosure can be applied to communication systems having any number of Ethernet links.

In an embodiment, communication system 100 initiates communication by accessing an information source. To facilitate this communication, networking core 106 (and networking core 118) is coupled to a communication network (not shown in FIG. 1). Therefore, networking core 106 (and networking core 118) is configured to acquire one or more sequences of digital data (e.g., audio data, video data, data transmitted over IP/Ethernet connection, or the like) directly from the core network. Networking devices 102 and 104 can be configured to support several additional services, such as time-division multiplexing (TDM), to provide an example.

Once networking core 106 acquires the digital data from the core network, networking core 106 transmits the digital data to ELAG transmitter device 108 in the form of data packets 136. ELAG transmitter device 108 may be configured to perform various operations on the incoming data packets 136. For example, ELAG transmitter device 108 may segment individual data packet 136 into various smaller sizes, it may add identification information to each data packet 136, or it may perform a combination of the two operations. In some embodiments, the identification information may be used by ELAG receiver device 122 to aggregate data packet 136 following transmission over Ethernet links 130-134. Additionally, ELAG transmitter device 108 may be configured to facilitate dynamic distribution of multiple incoming data packets 136 across Ethernet links 130-134 in accordance with one of three different distribution methods. Thus, ELAG transmitter device 108 may be configured to output incoming data packets 136 in the form of multiple data streams 138, 140 and 142. Specifically, ELAG transmitter device may be configured to output data stream 138 to Ethernet interface 112, data stream 140 to Ethernet interface 114 and data stream 142 to Ethernet interface 116.

When communication flows in the opposite direction (from networking device 104 to networking device 102), ELAG transmitter device 120 may operate in a substantially similar manner to ELAG transmitter device 108. Accordingly, a separate detailed description of ELAG transmitter device 120 has been omitted from the present disclosure.

ELAG transmitter devices 108 and 120, and the different distribution methods implemented by ELAG transmitter devices 108 and 120, will be discussed in greater detail below with reference to FIGS. 3 and 5-7.

Ethernet interfaces 112-116 may be configured to respectively receive data streams 138-142 from ELAG transmitter device 108. Ethernet interfaces 112-116 may also be configured to output data streams 138-142 over Ethernet links 130-134, respectively. Further, Ethernet interfaces 112-116 may be configured to add an Ethernet encapsulation to each data stream 138-142 before transmission across Ethernet links 130-134. In an embodiment, Ethernet interfaces 112-116 may add the Ethernet encapsulation with respect to the preamble and frame check sequence (FCS) of each data stream 138-142.

Following transmission over Ethernet links 130-134, data streams 138-142 may be received by networking device 104 at Ethernet interfaces 124-128, respectively. Ethernet interfaces 124-128 may be configured to remove the Ethernet encapsulation that may have been added to each data stream 138-142. Ethernet interfaces 124-128 may also be configured to output data streams 138-142 to ELAG receiver device 122.

ELAG receiver device 122 may be configured to perform various operations on the incoming data streams 138-142. In particular, ELAG receiver device 122 may be configured to perform appropriate inverse operations to those operations performed by ELAG transmitter device 108 such that the original data packet 136 can be recreated. Therefore, depending on which distribution method ELAG transmitter device 108 implements, ELAG receiver device 122 may perform a corresponding inverse aggregation method to re-combine data streams 138-142 into a single data stream. Additionally, depending on how ELAG transmitter device 108 segmented and/or rescheduled data packets 136, and depending on the identification information added to data packets 136, ELAG receiver device 122 may perform a corresponding reassembly and/or reordering of data packets 136 based on the included identification information. Following implementation of the appropriate inverse operations, ELAG receiver device 122 may be configured to output the recreated original data packets 136 to networking core 118.

When communication flows in the opposite direction (from networking device 104 to networking device 102), ELAG receiver device 110 may operate in a substantially similar manner to ELAG receiver device 122. Accordingly, a separate detailed description of ELAG receiver device 110 has been omitted from the present disclosure.

ELAG receiver devices 110 and 122, and the different aggregation methods implemented by ELAG receiver devices 110 and 122, will be discussed in greater detail below with reference to FIGS. 4-7.

By implementing ELAG transmitter device 108 and ELAG receiver device 110 within networking device 102, and by implementing ELAG transmitter device 120 and ELAG receiver device 122 within networking device 104, communication system 100 may be capable utilizing approximately 100% of the available bandwidth of the aggregated link (the collection of Ethernet links 130-134). In particular, by performing packet segmentation and dynamic distribution of the data packets, idle time that may have been present on the links within in conventional communication system (e.g. where available traffic is waiting for transmission) may be substantially eliminated. Additionally, ELAG transmitter devices 108 and 120 may be configured to continuously monitor the available bandwidth of each Ethernet link 130-134, thus allowing communication system 100 to account for the actual available bandwidth of each of the Ethernet links 130-134. This ability to continuously monitor the available bandwidth of each Ethernet link 130-134 results in communication system 100's aggregated link having the highest possible availability.

Figure 2:
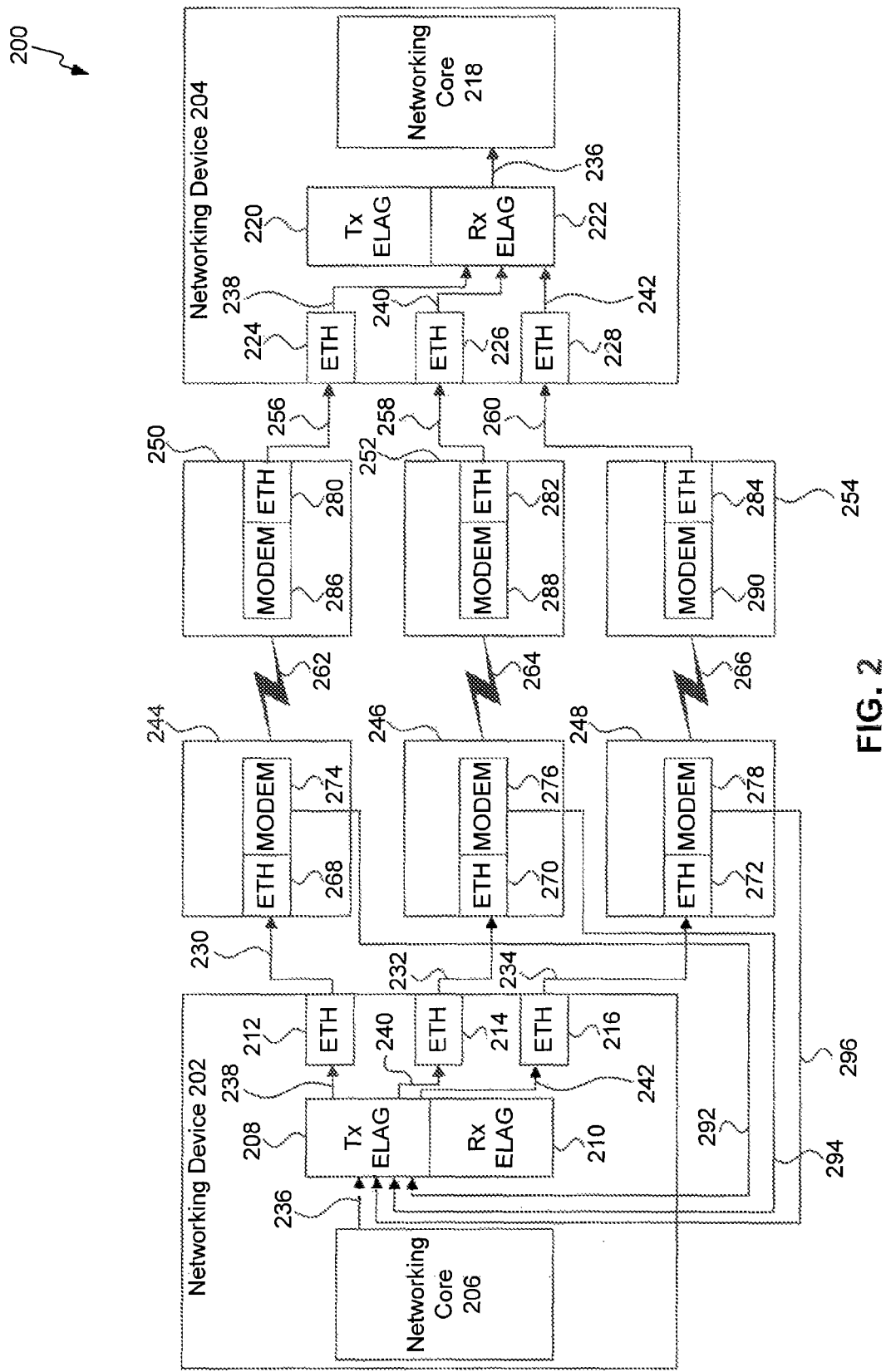
FIG. 2 illustrates a block diagram of a communication system implementing ELAG over an indirect connect according to an exemplary embodiment of the present disclosure.

FIG. 2 illustrates a block diagram of a communication system 200 implementing ELAG over an indirect connection (e.g. communication systems having non-Ethernet links) according to an exemplary embodiment of the present disclosure. Communication system 200 may also be configured to facilitate both terrestrial point-to-point (PtP) radio communications, as well as point-to-multipoint communications, and can include both wired and/or wireless communications.

Communication system 200 includes networking devices 202 and 204. In some embodiments, networking devices 202 and 204 may each represent a switch or a router, to provide some examples.

Networking device 202 includes a networking core 206, an ELAG transmitter device 208, an ELAG receiver device 210, and multiple Ethernet interfaces 212, 214 and 216. Similarly, networking device 204 includes a networking core 218, an ELAG transmitter device 220, an ELAG receiver device 222, and multiple Ethernet interfaces 224, 226 and 228. Networking device 202 may be directly connected to multiple transceiver devices 244, 246 and 248 via multiple Ethernet links 230, 232 and 234, respectively. Similarly, networking device 204 may be directly connected to multiple transceiver devices 250, 252 and 254 via multiple Ethernet links 256, 258 and 260, respectively. Although communication system 200 is illustrated as having three Ethernet links extending between networking device 202 and transceiver devices 244-248, and as having three Ethernet links extending between networking device 204 and transceiver devices 250-254, those skilled in the relevant art(s) will recognize that the present disclosure can be applied to communication systems having any number of Ethernet links.

In some embodiments, several of the elements implemented within communication system 200 may be configured to operate in substantially similar manners to the corresponding elements implemented within communication system 100 (see FIG. 1). Specifically, networking cores 206 and 218 may operate substantially similar to networking cores 106 and 118, respectively; ELAG receiver devices 210 and 222 may operate substantially similar to ELAG receiver devices 110 and 122, respectively; and Ethernet interfaces 212-216 and 224-228 may operate substantially similar to Ethernet interfaces 112-116 and 124-128, respectively. Accordingly, separate detailed descriptions of networking cores 206 and 218, ELAG receiver devices 210 and 222, and Ethernet interfaces 212-216 and 224-228 have been omitted from the present disclosure.

However, in contrast to communication system 100, which includes a direct connection between networking devices 102 and 104, communication system 200 includes an indirect connection between networking devices 202 and 204. Therefore, communication system 200 also includes multiple non-Ethernet links 262, 264 and 266 in additional to Ethernet links 230-234 and 256-260. In some embodiments, non-Ethernet links 262-266 may each represent at least one of a digital subscriber line (DSL), a radio frequency (RF) link, a microwave PtP link, a fiber optic cable, a coaxial cable, a twisted pair cable, a shielded cable, a category 5 cable, a category 6 cable, or one or more copper wires, to provide some examples.

The addition of non-Ethernet links 262-266 presents several additional challenges, which networking devices 202 and 204 must overcome. For example, the addition of non-Ethernet links 262-266 results in ELAG transmitter devices 208 and 220 no longer being directly connected to the aggregate link. This is in contrast to communication system 100 where ELAG transmitter devices 108 and 120 were directly connected (via Ethernet interfaces 112-116 and 124-128) to the aggregate link.

Instead, transceiver devices 244-248 are configured to act as intermediary devices between non-Ethernet links 262-266 and networking device 202, and transceiver devices 250-254 are similarly configured to act as intermediary devices between non-Ethernet links 262-266 and networking device 204. Transceiver devices 244-248 include Ethernet interfaces 268, 270 and 272, and modems 274, 276 and 278, respectively. Similarly, transceiver devices 250-254 include Ethernet interfaces 280, 282 and 284, and modems 286, 288 and 290, respectively.

Ethernet interfaces 268-272 may operate in substantially similar manners to Ethernet interfaces 124-128. In particular, Ethernet interfaces 268-272 may be configured to respectively receive data streams 238-242 (as Ethernet packets) over Ethernet links 230-234, and to remove Ethernet encapsulation that may have been added to each data stream 238-242 by Ethernet interfaces 212-216, respectively.

Additionally, Ethernet interfaces 280-284 may operate in substantially similar manners to Ethernet interfaces 112-116. In particular, Ethernet interfaces 280-284 may be configured to add Ethernet encapsulation to each data stream 238-242 (Ethernet packet) that is to be transmitted across Ethernet links 256-260.

Modems 274-278 and 286-290 may each be configured to perform modulation and demodulation of data streams 238-242, respectively. Modems 274-278 may also be configured to respectively convert the incoming data streams 238-242 received over Ethernet links 230-234 to a different physical (PHY) layer (e.g. DSL, fiber optic cable, coaxial cable, etc.) such that they can be transmitted over non-Ethernet links 262-266. Similarly, modems 286-290 may be configured to respectively convert data streams 238-242 received over non-Ethernet links 262-266 back into the original PHY layer (e.g. Ethernet) such that they can be transmitted over Ethernet links 256-260.

In some embodiments, modems 274-278 and 286-290 may be configured to extract relevant payload and control information from data streams 238-242, and to transmit the relevant payload and control information over non-Ethernet links 262-266. Additionally, modems 274-278 may be configured to add a modem encapsulation to data streams 238-242, respectively received from Ethernet interfaces 268-272, so as to encapsulate the payload and control information contained within data streams 238-242. For example, modems 274-278 may be configured to add modem encapsulation in the form of packet delineation overhead and modem framing overhead. Following transmission of data streams 238-242 over non-Ethernet links 262-266, modems 286-290 may be configured to remove the modem encapsulation that may have been added to data streams 238-242 so as to recover the payload and control information encapsulated in the data streams. Modems 286-290 may be further configured to output data streams 238-242 to Ethernet interfaces 280-284.

In some embodiments, a single Ethernet link may be used to transmit multiple streams of data to multiple modems using a virtual local area network (VLAN) domain, or the like.

Additionally, in an embodiment, modems 274-278 and 286-290 may be single channel modems (or multiple channel modems) of channelized modems (e.g. cross polarization interference (XPIC) and/or multiple-input multiple-output (MIMO) modems). In such instances, it may then be possible to perform the various distribution methods within the modems rather than within the ELAG transmitter devices.

As discussed above, the addition of non-Ethernet links 262-266 means that ELAG transmitter devices 208 and 220 may no longer be directly connected to the aggregate link. Therefore, the bandwidth detected by ELAG transmitter devices 208 and 220 may not represent the actual bandwidth available across non-Ethernet links 262-266. In conventional indirect communication systems, the networking devices would merely detect the bandwidth available across the Ethernet links (e.g. approximately 100 Mbps to approximately 10 Gbps), which may not accurately represent the available bandwidth across the non-Ethernet links (e.g. approximately 10 Mbps to approximately 162 Mbps). Thus, without additional capabilities being added to communication system 200, ELAG transmitter devices 208 and 220 may be unable to efficiently distribute the network load across each non-Ethernet link 262-266.

Therefore, modems 274-278 may be further configured to generate feedback information 292, 294, 296, respectively, which indicates the available bandwidth of each non-Ethernet link 262-266. Modems 274-278 may be configured to respectively output feedback information 292-296 back to ELAG transmitter device 208. In some embodiments, feedback information 292-296 can be carried as overhead as part of the Ethernet traffic in the opposite direction. In some embodiments, feedback information 292-296 may only be used in communication environments having variable link capacities.

Accordingly, in addition to the operations discussed above for ELAG transmitter device 108, ELAG transmitter device 208 is also configured to utilize feedback information 292-296 such that data streams 238-242 can be distributed over non-Ethernet links 262-266 in accordance with the actual available bandwidth of each non-Ethernet link 262-266. Thus, upon receipt of data packets 236 from networking core 206, ELAG transmitter device 208 may be configured to segment data packets 236, to reschedule data packets 236, and to dynamically distribute data packets 236 across Ethernet links 230-234 in accordance with feedback information 292-296 received from modems 274-278, respectively.

FLAG transmitter devices 208 and 220, and the different distribution methods implemented by ELAG transmitter devices 208 and 220, will be discussed in greater detail below with reference to FIGS. 3 and 5-7.

Communication system 200 may thus be capable of utilizing approximately 100% of the available bandwidth of the aggregated link (the collection of non-Ethernet link 262-266), even though ELAG transmitter devices 208 and 220 may not be directly connected to the aggregated link. In particular, by implementing ELAG transmitter device 208 having the ability to segment, reschedule, and dynamically distribute data packets 236 based on the actual available bandwidth of the aggregated link, idle time that may have been present on the links within in conventional communication system (e.g. where available traffic is waiting for transmission) may be substantially eliminated.

Additionally, using feedback information 292-296, ELAG transmitter device 208 may be configured to continuously monitor the available bandwidth of each non-Ethernet link 262-266. Therefore, communication system 200 may be configured to account for dynamic changes in the available bandwidth of each of the non-Ethernet links 262-266. This ability to continuously monitor the available bandwidth of each non-Ethernet link 262-266 results in communication system 200's aggregated link having improved availability. In particular, by continuously monitoring the available bandwidth of each non-Ethernet link 262-266, ELAG transmitter device 208 may be able to more accurately, and more quickly, detect if one of the links fails. Therefore, ELAG transmitter device 108 may be able to compensate for this link failure in a more efficient manner, thereby improving availability for the aggregated link.

An Exemplary ELAG Transmitter Device

Figure 3:
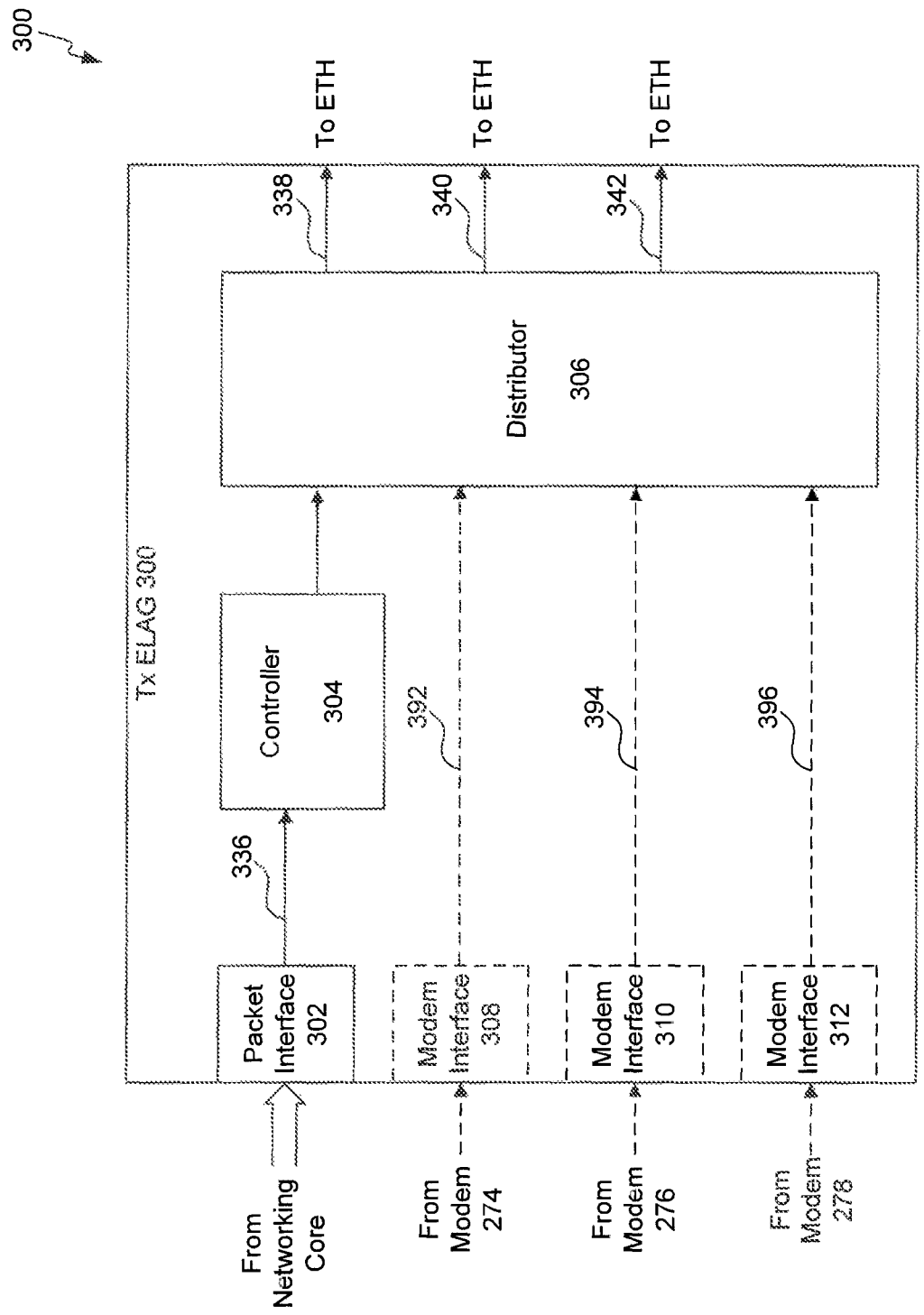
FIG. 3 illustrates a block diagram of an ELAG transmitter device according to an exemplary embodiment of the present disclosure.

FIG. 3 illustrates a block diagram of an ELAG transmitter device 300 according to an exemplary embodiment of the present disclosure. In some embodiments, ELAG transmitter device 300 may represent an exemplary embodiment of ELAG transmitter devices 108 and 120 from FIG. 1, or ELAG transmitter devices 208 and 220 from FIG. 2.

ELAG transmitter device 300 includes a packet interface 302, a controller 304 and a distributor 306. In some embodiments, ELAG transmitter device 300 may also include multiple modem feedback interfaces 308, 310 and 312.

Packet interface 302 may be configured to receive data packets 336 from a networking core, such as networking core 106 from FIG. 1 or networking core 206 from FIG. 2, to provide some examples. Packet interface 302 may also be configured to output the received data packets 336 to controller 304.

Controller 304 may be configured to perform various operations on the incoming data packets 336. For example, controller 304 may be configured to add a sequence number to each of the respective data packets 336 that are to be transmitted across each individual link (either Ethernet links 130-134 from FIG. 1 or non-Ethernet links 262-266 from FIG. 2). The sequence number added to data packets 336, may be utilized by an ELAG receiver device, located on the opposite end of the aggregate link, to determine the length of each data packet 336 transmitted by ELAG transmitter device 300.

In some embodiments, controller 304 may also be configured to segment at least some of data packets 336. For example, controller 304 may segment relatively large packets such that each data packet 336 transmitted across the aggregate link has a relatively small packet size. This segmentation operation may allow ELAG transmitter device 300 to further reduce latency with its corresponding communication system. Following segmentation of data packets 336, controller 304 may also be configured to add a segmentation overhead to each of the segmented data packets. Similar to the sequence number discussed above, the segmentation overhead may be utilized upon receipt by an ELAG receiver device to properly reconstruct any data packets that may have been segmented. Additionally, controller 304 may be configured to reschedule the transmission of the incoming data packets 336 based on a relative priority of each data packet 336. For example, controller 304 may reschedule data packets 336 such that high priority data packets are transmitted before lower priority packets.

Further, controller 304 may be configured to convert the incoming data packets 336 into a byte stream. In some embodiments, controller 304 may convert data packets 336 into a byte stream using a generic framing procedure (GFP), or the like.

Distributor 306 may be configured to perform a logical distribution of data packets 336 following implementation of any of the aforementioned operations by controller 304. Distributor 306 may be configured to distribute data packets 336 across each of the individual links comprising the aggregate link according to multiple different distribution methods. For example, distributor 306 may be configured to distribute data packets 336 using a packet based distribution method, a segmented packet distribution method, or a byte based distribution method. Each of these distribution methods will be discussed in greater detail below with respect to FIGS. 5-7.

Regardless of the distribution method implemented by distributor 306, distributor 306 may be configured to distribute data packets 336 based on the actual available bandwidth of each individual link that comprises the aggregate link. As discussed above, in direct connection communication systems, such as communication system 100, the networking devices are directly connected to the aggregate link. Therefore, in direct connection communication systems, the ELAG transmitter devices are able to directly monitor the actual available bandwidth of each of the individual links that comprise the aggregate link. Accordingly, when ELAG transmitter device 300 is implemented within a direct connection communication system, such as communication system 100, distributor 306 may be configured to directly monitor the available bandwidth of each of the individual links and logically distribute data packets 336 across each individual link based on the detected bandwidths.

However, as also discussed above, detection of the actual available bandwidth of each of the individual links in an indirect connection communication system can be substantially more complicated. In particular, the addition of non-Ethernet links to an indirect communication system, such as communication system 200, means that the bandwidth detected by the ELAG transmitter devices may not represent the actual bandwidth available across each of these non-Ethernet links. Instead, in conventional indirect communication systems, a transmitter device may only be capable of detecting the bandwidth of the Ethernet links directly connected to each networking device.

Therefore, when ELAG transmitter device 300 is implemented within an indirect communication system, such as communication system 200, ELAG transmitter device 300 may also be configured to receive feedback information 392, 394 and 396 from each modem associated with the non-Ethernet links. For example, modem interfaces 308-312 may be configured to respectively receive feedback information 392-396 from modems 274-278, respectively (see FIG. 2). More specifically, feedback information 392-396 can be feedback information 292-296 that is sent from respective modem 274-278. In some embodiments, feedback information 392-396 can be carried as overhead as part of the Ethernet traffic in the opposite direction. Modem interfaces 308-312 may also be configured to output the received feedback information 392-396 to distributor 306. Accordingly, when ELAG transmitter device 300 is implemented within an indirect communication system, distributor 306 may be further configured to logically distribute data packets 336 across each non-Ethernet link based on feedback information 392-396 received from the modems associated with each non-Ethernet link.

Following implementation of an appropriate distribution method, distributor 306 may be configured to output a data stream 338, 340 and 342 to an Ethernet interface associated with each individual link that comprises the aggregate link.

Each of the distribution methods referenced above (packet based distribution, segmented packet distribution, and byte based distribution) dictate how each of the data packets 336 are to be segmented, converted, prioritized, and ordered prior to their distribution over the aggregate link. However, once one of these three distribution methods has been chosen, distributor 306 still needs to perform the actual distribution of data packets 336. Accordingly, distributor 306 may be configured to perform the actual distribution of data packets 336 based on a variety of different distribution techniques. For example, distributor 306 may be configured to distribute data packets 336 using a weighted round robin (WRR) distribution technique where the weight of each individual link may represent the actual available bandwidth of that link. For example, higher weights indicate more bandwidth. Therefore, when a WRR distribution technique is implemented, the weights allocated to each individual link may be updated periodically to reflect changes in the bandwidths of each of the links.

Distributor 306 may be further configured to add an additional header to each of the distributed data packets to indicate the distribution method implemented by distributor 306 (e.g. a WRR distribution technique).

In some embodiments, when a byte based distribution method is chosen, distributor 306 may be configured to perform additional operations to facilitate such the distribution of data packets 336. For example, distributor 306 may be configured to add alignment information to the generated byte stream as overhead. In some embodiments, the alignment information may indicate an offset between each of the individual links that comprise the aggregate link, and may be used to compensate for skew and rate variances. Additionally, the alignment information may indicate the location of the aligned bytes. Similar to the sequence number and segmentation overhead discussed above, the alignment information, and the header indicative of the implemented distribution method, may each be utilized upon receipt by an ELAG receiver device to properly aggregate and reorder the data packets following transmission over the aggregate link.

An Exemplary ELAG Receiver Device

Figure 4:
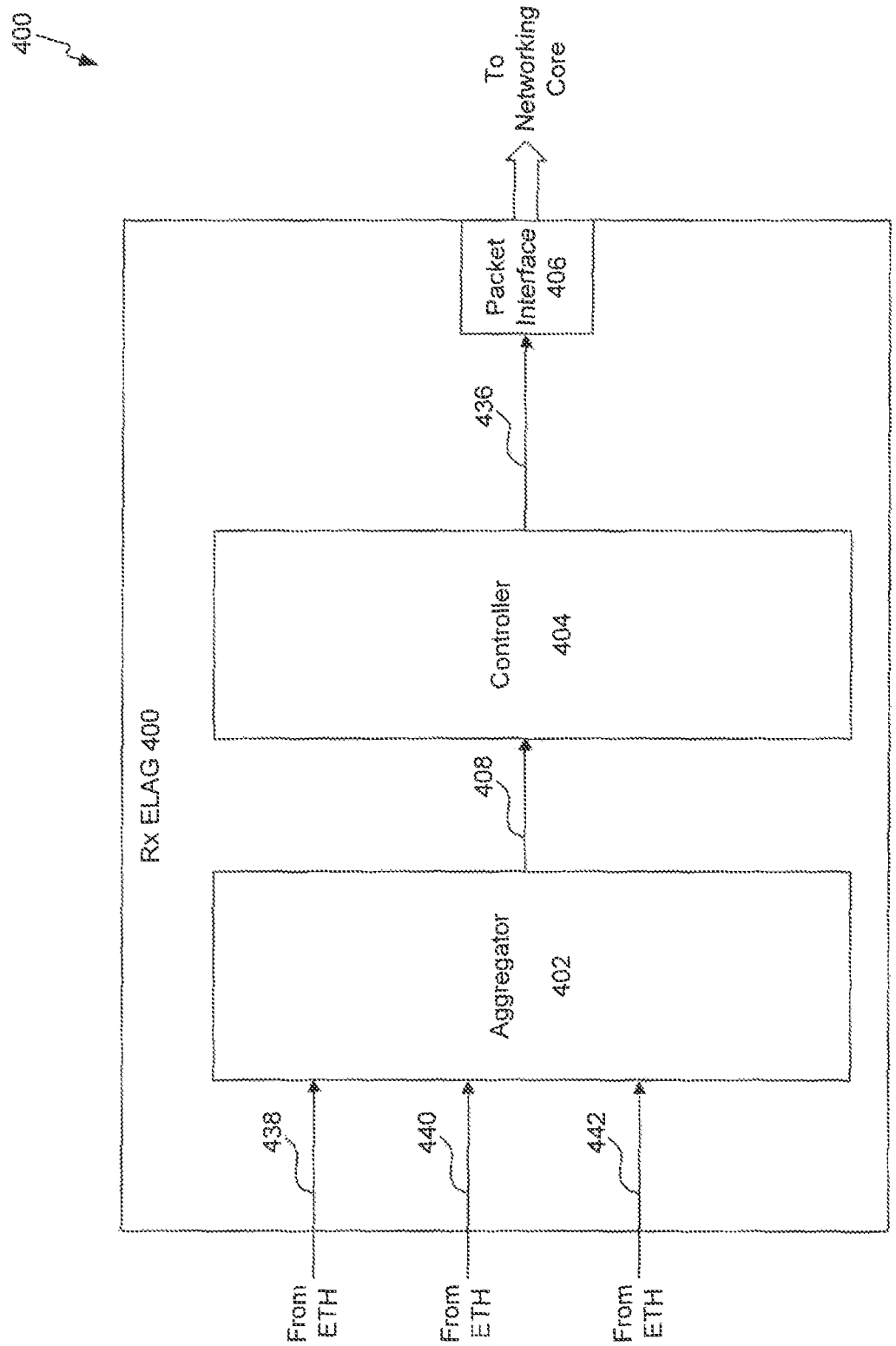
FIG. 4 illustrates a block diagram of an ELAG receiver device according to an exemplary embodiment of the present disclosure.

FIG. 4 illustrates a block diagram of an ELAG receiver device 400 according to an exemplary embodiment of the present disclosure. In some embodiments, ELAG receiver device 400 may represent an exemplary embodiment of ELAG receiver devices 110 and 122 from FIG. 1, or ELAG receiver devices 210 and 222 from FIG. 2. ELAG receiver device 400 includes an aggregator 402, a controller 404 and a packet interface 406.

During operation, ELAG transmitter device 300 may facilitate the transmission of multiple data streams over an aggregated link (e.g. the collection of Ethernet links 130-134 or the collection of non-Ethernet links 262-266). Following this transmission, ELAG receiver device 400 may be configured to receive the data stream 438, 440 and 442 via multiple Ethernet interfaces. For example, ELAG receiver device 400 may be configured to receive data streams 438-442 via Ethernet interfaces 224-228, respectively (see FIG. 2).

Upon receipt of data streams 438-442, aggregator 402 may be configured to aggregate the data streams such that a single data stream 408 can be recreated. Therefore, aggregator 402 may be configured to aggregate data streams 438-442 using an inverse of the distribution method implemented by distributor 306 (see FIG. 3). Accordingly, aggregator 402 may be configured to detect whether distributor 306 implemented a packet based distribution method, a segmented packet distribution method, or a byte based distribution method, and may then aggregate the multiple data streams back into a single data stream 408 in accordance with the implemented distribution method. In some embodiments, aggregator 402 may be configured to detect which distribution method has been implemented by examining the headers included within each of data streams 438-442.

Additionally, as discussed above, ELAG transmitter device 300 may reschedule segmented packets or bytes to reduce latency within the communication system. Therefore, when the full packets, segmented packets, or individual bytes are received out-of-order, aggregator 402 may be configured to reorder the segmented packets and individual bytes into a single reordered data stream 408. In some embodiments, aggregator 402 may reorder the segmented packets and individual bytes by examining priority information and alignment information that was added to the data streams by ELAG transmitter device 400.

Similar to aggregator 402, controller 404 may be configured to perform various inverse operations to the operations that were performed by controller 304 (see FIG. 3). For example, controller 404 may be configured to remove a sequence number or segmentation overhead that may have been added to the data streams by controller 304. As discussed above, the sequence numbers and segmentation overheads allow controller 404 to determine the length of each data stream transmitted by ELAG transmitter device 300. Therefore, using these sequence numbers, controller 404 can reconstruct the original data packets 436 by reassembling each individual data packet, or segmented data packet.

Additionally, or alternatively, when a byte base distribution method is implemented by ELAG transmitter device 300, controller 404 may be configured to convert the incoming byte stream back into the original data packets 436. In some embodiments, controller 404 may convert the incoming byte stream back into the original data packets 436 using an inverse GFP, or the like.

Packet interface 406 may be configured to receive data packets 436 from controller 404. Packet interface 406 may then output data packets 436 to a networking core, such as networking core 106 from FIG. 1 or networking core 206 from FIG. 2, to provide some examples.

Exemplary Distribution Methods

Figure 5:
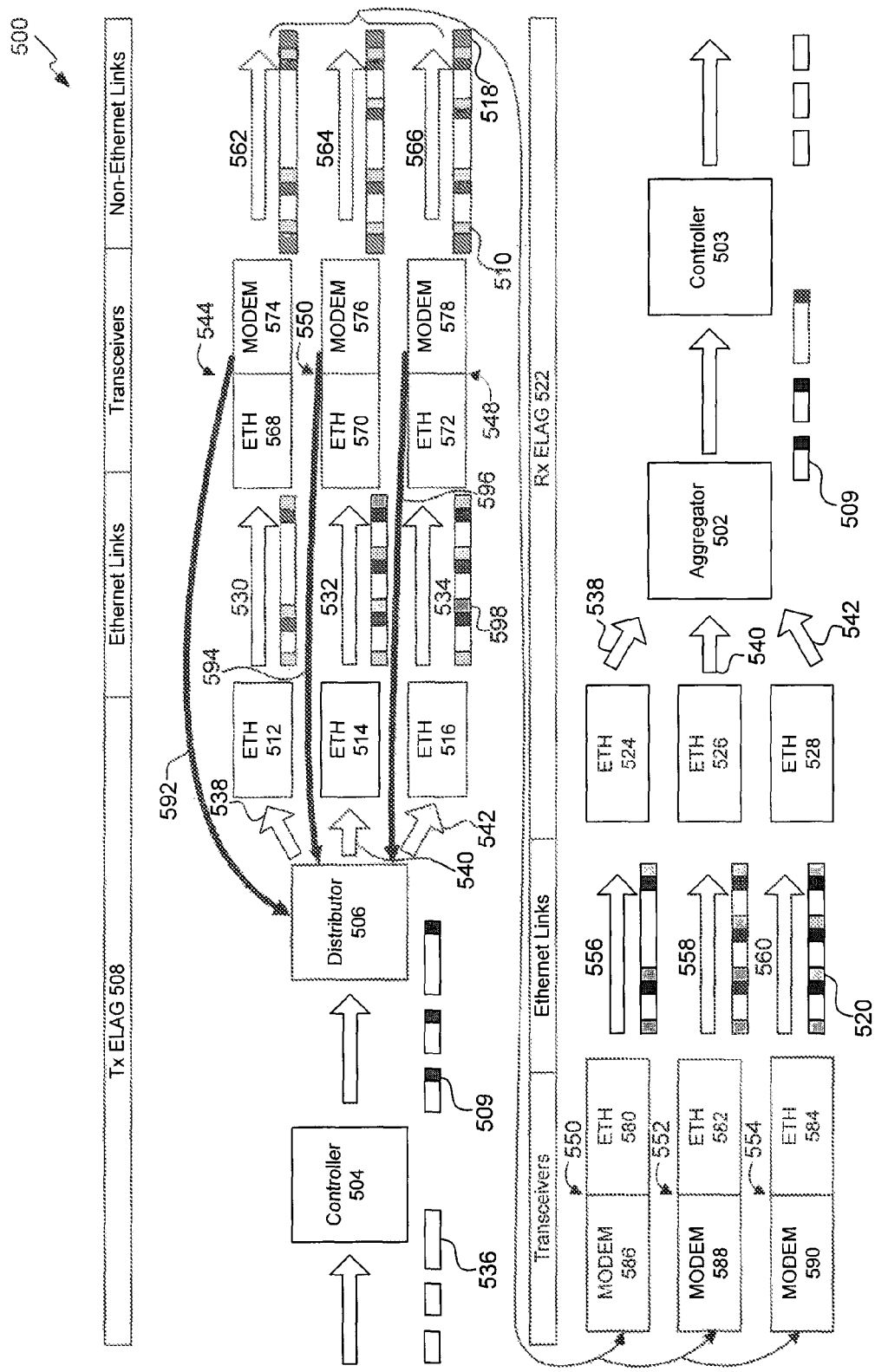
FIG. 5 illustrates a block diagram of a communication system implementing a first ELAG distribution method according to an exemplary embodiment of the present disclosure.

FIG. 5 illustrates a block diagram of a communication system 500 implementing a packet based distribution method according to an exemplary embodiment of the present disclosure.

Communication system 500 includes an ELAG transmitter device 508 and an ELAG receiver device 522. In some embodiments, ELAG transmitter device 508 and ELAG receiver device 522 may represent exemplary embodiments of ELAG transmitter device 208 and ELAG receiver device 222 from FIG. 2, respectively. Additionally, communication system 500 includes multiple Ethernet links 530-534 and 556-560, multiple non-Ethernet links 562-566, and multiple transceiver devices 544-554. In some embodiments, Ethernet links 530-534 and 556-560, non-Ethernet links 562-566, and transceiver devices 544-554 may represent exemplary embodiments of Ethernet links 230-234 and 256-260, non-Ethernet links 262-266, and transceiver devices 244-254 from FIG. 2, respectively.

When ELAG transmitter device 508 implements a packet base distribution method, ELAG transmitter device 508 may be configured to transmit each data packet in its entirety across Ethernet links 530-534. Accordingly, during operation of the packet based distribution method, multiple data packets 536 may be received by controller 504. In some embodiments, controller 504 may represent an exemplary embodiment of controller 304 from FIG. 3. Controller 504 may be configured to add a sequence number 509 to each data packet 536, which may be used to re-order packets at the receiver if necessary. Controller 504 may then output data packets 536, having sequence numbers 509, to a distributor 506. In some embodiments, distributor 506 may represent an exemplary embodiment of distributor 306 from FIG. 3.

Distributor 506 may be configured to distribute data packets 536 in their entireties as multiple data streams 538, 540 and 542 to Ethernet interfaces 512-516 based on an available bandwidth of each non-Ethernet link 562-566. In some embodiments, Ethernet interfaces 512-516 may represent exemplary embodiments of Ethernet links 212-216 from FIG. 2, respectively. Ethernet interfaces 512-516 may be configured to add an Ethernet encapsulation 598 to each data stream 538-542, and to transmit data streams 538-542, having sequence numbers 509 and Ethernet encapsulation 598, across Ethernet links 530-534, respectively.

Data streams 538-542 may then be received at transceiver devices 544-548, by Ethernet interfaces 568-572, respectively. In some embodiments, Ethernet interfaces 568-572 may represent exemplary embodiments of Ethernet interfaces 268-272 from FIG. 2, respectively. Ethernet interfaces 568-572 may be configured to remove Ethernet encapsulation 598 from data streams 538-542, and to output data streams 538-542 to modems 574-578, respectively. In some embodiments, modems 574-578 may represent exemplary embodiments of modems 274-278 from FIG. 2, respectively.

Modems 574-578 may be configured to add a modem encapsulation to data streams 538-542, respectively. In some embodiments, the modem encapsulation may include both a packet delineation overhead 510 and a modem framing overhead 518. Additionally, modems 574-578 may also generate feedback information 592-596, respectively, and may output feedback information 592-596 back to distributor 506. As discussed above, feedback information 592-596 may indicate an actual available bandwidth of non-Ethernet links 562-566, respectively. Accordingly, distributor 506 may be configured to utilize feedback information 592-596 to logically distribute data streams 538-542 across non-Ethernet links 562-566 such that the available bandwidth of each link is most efficiently utilized. In an embodiment, feedback information 592-596 can be carried as overhead as part of the Ethernet traffic in the opposite direction.

Data streams 538-542 may then be transmitted over the aggregate link such that data streams 538-542 are received by modems 586-590, respectively. In some embodiments, modems 586-590 may represent modems 286-290 from FIG. 2, respectively. Modems 586-590 may be configured to remove the modem encapsulation from data streams 538-542, which may have been added by modems 574-578 prior to transmission over the aggregate link. Modems 586-590 may then output the received data streams 538-542 to Ethernet interfaces 580-584, respectively. In some embodiments, Ethernet interfaces 580-584 may represent exemplary embodiments of Ethernet links 580-584 from FIG. 2, respectively.

Ethernet interfaces 580-584 may be configured to again add an Ethernet encapsulation 520 to each data stream 538-542, and to transmit data streams 538-542, having sequence numbers 509 and Ethernet encapsulation 520, across Ethernet links 556-560, respectively.

Data streams 538-542 may then be received at ELAG receiver device 522, by Ethernet interfaces 524-528, respectively. In some embodiments, Ethernet interfaces 524-528 may represent exemplary embodiments of Ethernet interfaces 224-228 from FIG. 2, respectively. Ethernet interfaces 524-528 may be configured to remove Ethernet encapsulation 520 from data streams 538-542, and to output data streams 538-542 to aggregator 502. In some embodiments, aggregator 502 may represent an exemplary embodiments of aggregator 402 from FIG. 4.

Aggregator 502 may be configured to aggregate and reorder the multiple data streams 538-542 back into a single data stream. Aggregator 502 may also be configured to output the single data stream, including sequence numbers 509, to controller 503. In some embodiments, controller 503 may represent an exemplary embodiment of controller 404 from FIG. 4.

Controller 503 may be configured to remove sequence numbers 509 from the aggregated data stream. Additionally, controller 503 may be configured to convert the aggregated data stream back into the original data packets 536.

The packet based distribution method depicted in FIG. 5 has the advantage of reducing latency of communication system 500 beyond what was previously possible with conventional transmission methods. Additionally, this packet based distribution method is relatively easy to implement. However, packet based distribution may still result in relatively high latency when compared to segmented packet distribution methods, and byte based distribution methods (see FIGS. 6 and 7, respectively). In particular, with the packet based distribution method, each data packet 536 may be transmitted over a single link. Thus, the time that it takes to transmit a single data packet 536 is given by packet_length/link_bandwidth, where link_bandwidth represents the lowest available bandwidth among each of the non-Ethernet link 562-566. Additionally, because data packets 536 may not be transmitted across the aggregate link in order, aggregator 502 may have to reorder data streams 538-542 once they are received at ELAG receiver device 522, for example using the sequence number 509. Due to this potential need for reordering, even data packets 536 that may be quickly transmitted across the aggregate link (either because the packets are relatively short and/or because they were transmitted over a link with a higher available bandwidth), may be delayed by the slower data packets 536.

In some embodiments, packet based distribution methods may require the addition of relatively large buffers to ELAG transmitter device 508 to hold entire data packets while other data packets are completing transmission across the aggregate link. Similarly, relatively large buffers may also need to be added to ELAG receiver device 522 to hold entire data packets while reordering of the data packets takes place.

Figure 6:
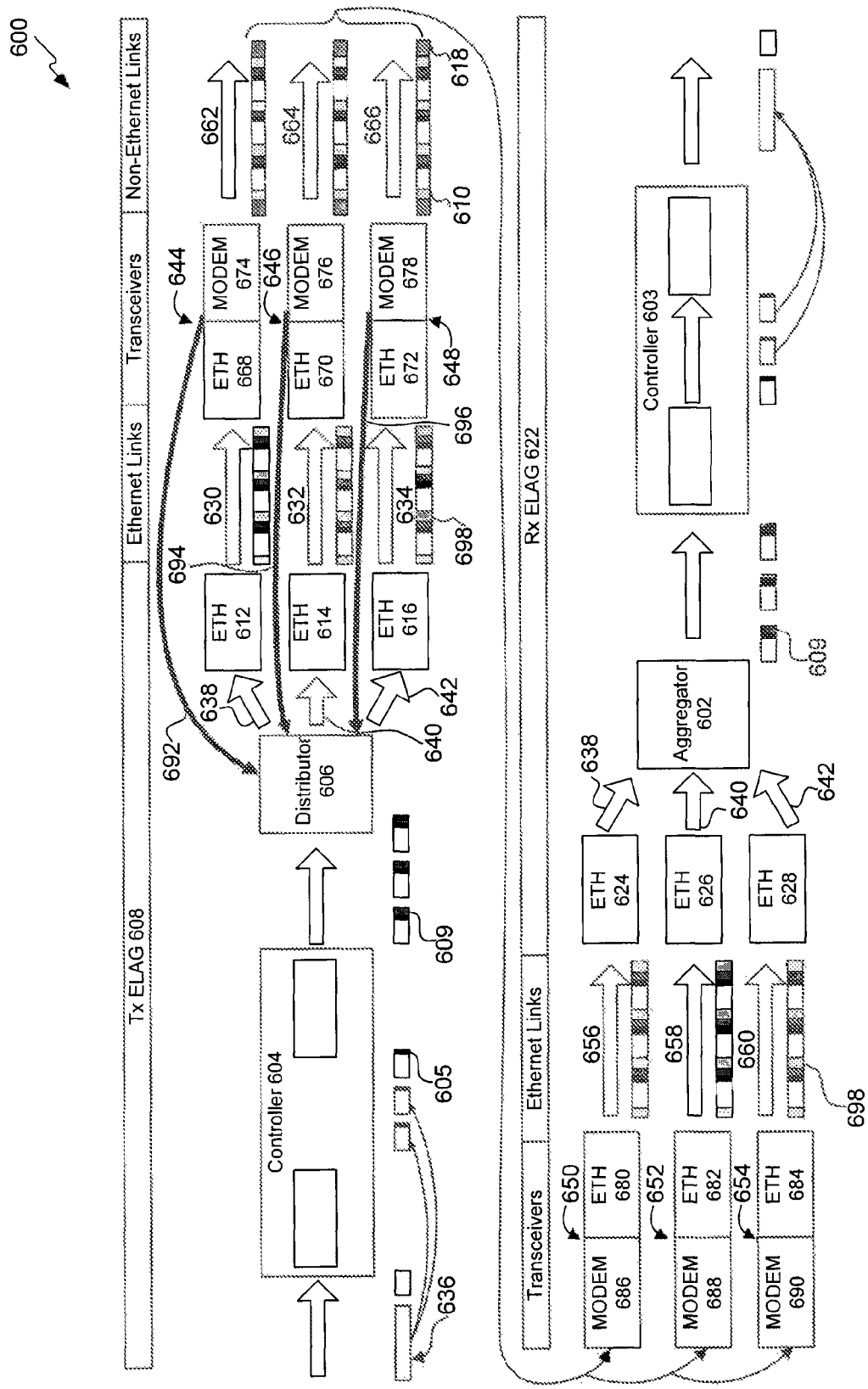
FIG. 6 illustrates a block diagram of a communication system implementing a second ELAG distribution method according to an exemplary embodiment of the present disclosure.

FIG. 6 illustrates a block diagram of a communication system 600 implementing a segmented packet distribution method according to an exemplary embodiment of the present disclosure.

Communication system 600 includes an ELAG transmitter device 608 and an ELAG receiver device 622. In some embodiments, ELAG transmitter device 608 and ELAG receiver device 622 may represent exemplary embodiments of ELAG transmitter device 208 and ELAG receiver device 222 from FIG. 2, respectively. Additionally, communication system 600 includes multiple Ethernet links 630-634 and 656-660, multiple non-Ethernet links 662-666, and multiple transceiver devices 644-654. In some embodiments, Ethernet links 630-634 and 656-660, non-Ethernet links 662-666, and transceiver devices 644-654 may represent exemplary embodiments of Ethernet links 230-234 and 256-260, non-Ethernet links 262-266, and transceiver devices 244-254 from FIG. 2, respectively.

When ELAG transmitter device 608 implements a segmented packet distribution method, ELAG transmitter device 608 may be configured to segment relatively large data packets before being transmitted across Ethernet links 630-634. Accordingly, during operation of the segmented packet distribution method, multiple data packets 636 may be received by controller 604. In some embodiments, controller 604 may represent an exemplary embodiment of controller 304 from FIG. 3. Controller 604 may be configured to perform segmentation of at least some of data packets 636. For example, controller 604 may be configured to segment larger packets included in data packets 636 into smaller packets, each having a segmentation overhead 605 that identifies the larger data packet so the smaller packets can be reassembled into the larger data packet at the receiver. Additionally, controller 604 may be configured to reschedule the data packets 636 (including any segmented packets) such that packets designated as having a "high priority" are transmitted across Ethernet links 630-634 before packets designated as having a "low priority." Further, controller 604 may be configured to add a sequence number 609 to each data packet 636 (including any segmented packets). Controller 604 may then output data packets 636, having sequence numbers 609, to a distributor 606. In some embodiments, distributor 606 may represent an exemplary embodiment of distributor 306 from FIG. 3.

Distributor 606 may be configured to distribute data packets 636 (including any segmented packets) as multiple data streams 638, 640 and 642 to Ethernet interfaces 612-616 based on an available bandwidth of each non-Ethernet link 662-666. This is in contrast to the packet based distribution method illustrated in FIG. 5 where each data packet 536 was distributed to Ethernet interfaces 512-516 in its entirety.

The remaining aspects of the transmission process of data packets 636 over the aggregate link are substantially similar to those aspects discussed above with respect to FIG. 5, until data packets 636 reach ELAG receiver device 622. Therefore, an additional discussion of Ethernet interfaces 612-616, 624-628, 668-672, and 680-684, transceiver devices 644-654, Ethernet links 630-634 and 656-660, and non-Ethernet links 662-666 are not repeated herein for brevity.

Following transmission over the aggregate link, data streams 638-642 may then be received at ELAG receiver device 622, by Ethernet interfaces 624-628, respectively. Ethernet interfaces 624-628 may be configured to output data streams 638-642 to aggregator 602. In some embodiments, aggregator 602 may represent an exemplary embodiments of aggregator 402 from FIG. 4.

Aggregator 602 may be configured to aggregate and reorder the multiple data streams 638-642 back into a single data stream. Aggregator 602 may also be configured to output the single data stream, including sequence numbers 602 and segmentation overhead 605, to controller 603. In some embodiments, controller 603 may represent an exemplary embodiment of controller 404 from FIG. 4.

Controller 603 may be configured to remove sequence numbers 609 and segmentation overhead 605 from the aggregated data stream. Controller 603 may also be configured to reassemble any segmented packets back into full-length packets using the segmentation overhead 605, and further re-order the packets as necessary using the sequence number 609. Further, controller 603 may be configured to convert the aggregated data stream, and reassembled packets, back into the original data packets 636.

The segmented packet distribution method depicted in FIG. 6 is similar to the packet based distribution method from FIG. 5. However, the segmented packet distribution method provides an even greater reduction in latency due to packet segmentation and rescheduling of the packets based on priority. For example, a long low priority packet can be segmented, and the first segment(s) can begin to be transmitted. However, if during this transmission a high priority packet becomes ready for transmission, the high priority packet may be transmitted before the remaining segments of the low priority packet are transmitted. Segmented packet distribution thus allows for a single data packet to be transmitted over multiple links because various segments of the data packet can each be transmitted over a different link. The various segments are then reassembled at the destination using the segmentation overhead. This is in contrast to packet based distribution where the entirety of each data packet is transmitted over a single link.

Figure 7:
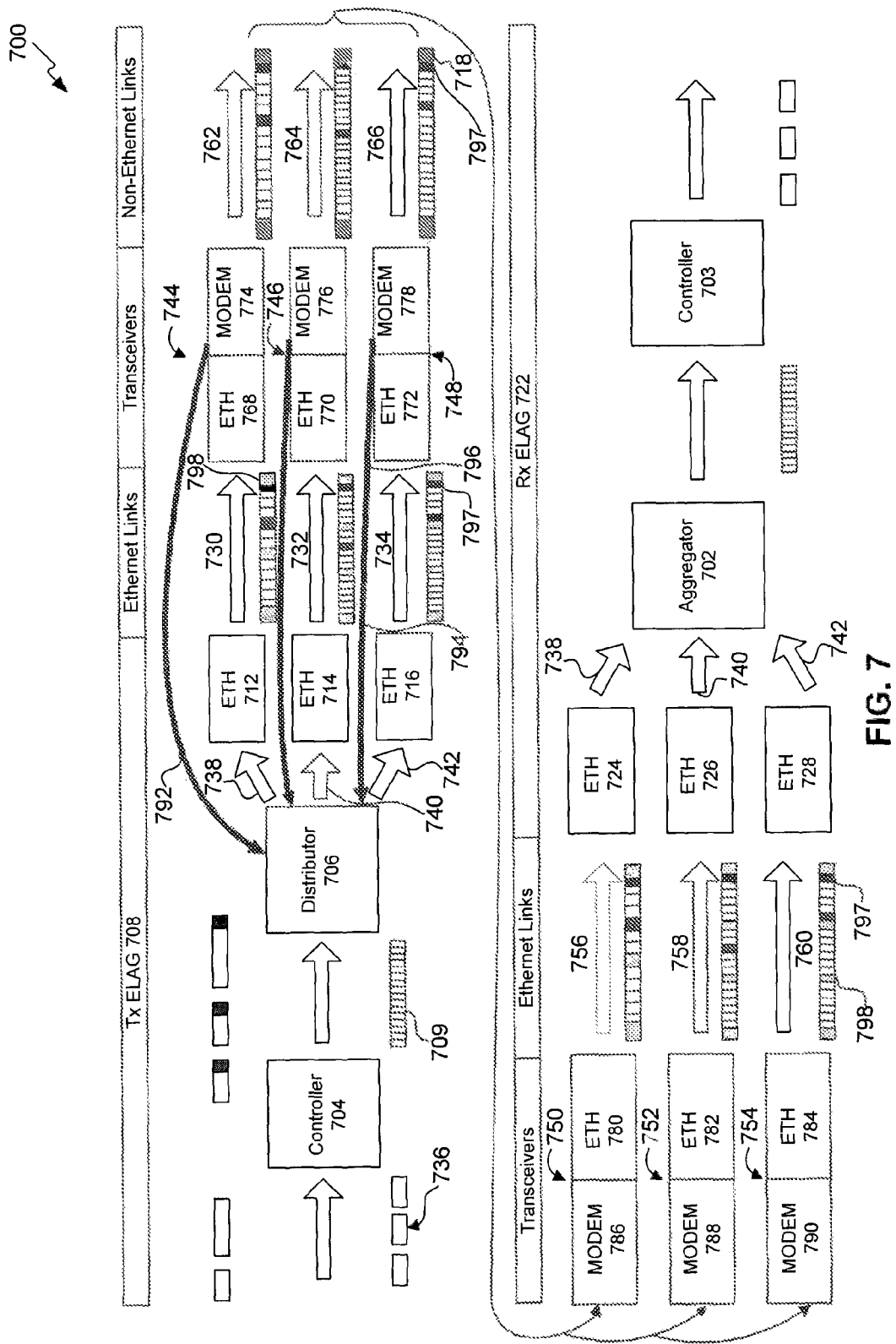
FIG. 7 illustrates a block diagram of a communication system implementing a third ELAG distribution method according to an exemplary embodiment of the present disclosure.

FIG. 7 illustrates a block diagram of a communication system 700 implementing a byte based distribution method according to an exemplary embodiment of the present disclosure.

Communication system 700 includes an ELAG transmitter device 708 and an ELAG receiver device 722. In some embodiments, ELAG transmitter device 708 and ELAG receiver device 722 may represent exemplary embodiments of ELAG transmitter device 208 and ELAG receiver device 222 from FIG. 2, respectively. Additionally, communication system 700 includes multiple Ethernet links 730-734 and 756-760, multiple non-Ethernet links 762-766, and multiple transceiver devices 744-754. In some embodiments, Ethernet links 730-734 and 756-760, non-Ethernet links 762-766, and transceiver devices 744-754 may represent exemplary embodiments of Ethernet links 230-234 and 256-260, non-Ethernet links 262-266, and transceiver devices 244-254 from FIG. 2, respectively.

When ELAG transmitter device 708 implements a byte based distribution method, ELAG transmitter device 708 may be configured to convert the incoming data packets 736 into a byte stream before being transmitted across Ethernet links 730-734. Accordingly, during operation of the byte based distribution method, multiple data packets 736 may be received by controller 704. In some embodiments, controller 704 may represent an exemplary embodiment of controller 304 from FIG. 3. Controller 704 may be configured to convert data packets 736 into a byte stream 709 using a generic framing procedure (GFP), or the like. Controller 704 may also be configured to add delineation bytes and idle bytes to byte stream 709. Controller 704 may then output byte stream 709 to a distributor 706. In some embodiments, distributor 706 may represent an exemplary embodiment of distributor 306 from FIG. 3.

Distributor 706 may be configured to distribute byte stream 709 as multiple byte streams 738, 740 and 742 to Ethernet interfaces 712-716 based on an available bandwidth of each non-Ethernet link 762-766. Distributor 706 may distribute byte stream 709 on a byte-by-byte basis or on a cell-by-cell basis, where a cell may represent a variable chunk of information (e.g. multiple bytes). Additionally, distributor 706 may be configured to add alignment information 797 as overhead to each byte stream 738-742. Alignment information 797 may indicate an offset (e.g. a temporal offset, a special offset, etc.) between Ethernet links 730-734, and alignment information 797 may be utilized to compensate for skew and rate variances. Further, alignment information 797 may indicate a location of the alignment bytes in each byte stream 738-742. In some embodiments, alignment information 797 may also be indicative of the distribution technique implemented by distributor 706, such as weighted round robin (WRR), to provide an example.

Ethernet interfaces 712-716 may be configured to add an Ethernet encapsulation 798 to each byte stream 738-742. Ethernet interfaces 712-716 may also be configured to transmit byte streams 738-742, having alignment information 797 and Ethernet encapsulation 798, across Ethernet links 730-734, respectively.

The remaining aspects of the transmission process of data packets 736 over the aggregate link are substantially similar to those aspects discussed above with respect to FIGS. 5 and 6, until data packets 736 reach ELAG receiver device 722. Therefore, an additional discussion of Ethernet interfaces 724-728, 768-772, and 780-784, transceiver devices 744-754, Ethernet links 730-734 and 756-760, and non-Ethernet links 762-766 are not repeated herein for brevity.

Following transmission over the aggregate link, byte streams 738-742 may then be received at ELAG receiver device 722, by Ethernet interfaces 724-728, respectively. Ethernet interfaces 724-728 may be configured to output byte streams 738-742 to aggregator 702. In some embodiments, aggregator 702 may represent an exemplary embodiments of aggregator 402 from FIG. 4.

Aggregator 702 may be configured to aggregate and reorder the multiple byte streams 738-742 back into a single byte stream 709 based on the distribution and alignment information 797 that was received as overhead within byte streams 738-742. Aggregator 702 may also be configured to output the single byte stream 709 to controller 703. In some embodiments, controller 703 may represent an exemplary embodiment of controller 404 from FIG. 4.

Controller 703 may be configured to convert the single byte stream 709 back into the original data packets 736.

The byte based distribution method depicted in FIG. 7 is similar to the segmented packet distribution method from FIG. 6. However, the byte based distribution method provides for even better performance of the links because it allows for full load sharing. For example, with the segmented packet distribution method, the segmented data packets may have different sizes. However, with the byte based distribution method, each packet is converted into equally sized bytes or cells. Accordingly, using the byte based distribution method, each data packet may be sent over all of the available links together, and thus may experience the full capacity of the multi-link communication system. Therefore, the time that it takes to pass a single packet using the byte based distribution method may be represented as packet_length/multi_link_bandwidth, where multi_link_bandwidth is the sum of the bandwidth of all the available links.

In some embodiments, the segmented packet distribution method may be implemented in conjunction with this scheme to further improve performance. For example, data packets may be segmented and rescheduled (using the segmented packet distribution method) and then may be sent over the aggregate link using byte-by-byte distribution.

Additionally, the byte based distribution method is not limited to the transmission of data packets. Instead, the byte based distribution method may also be used to pass time-division multiplexing (TDM) traffic or any other stream of information.

Although the distribution methods illustrated in FIGS. 5-7 are depicted in terms of indirect connection communication systems, those skilled in the relevant arts will understand that these distribution methods are also applicable to direct connection communication systems without departing from the spirit and scope of the present invention.

Figure 8:
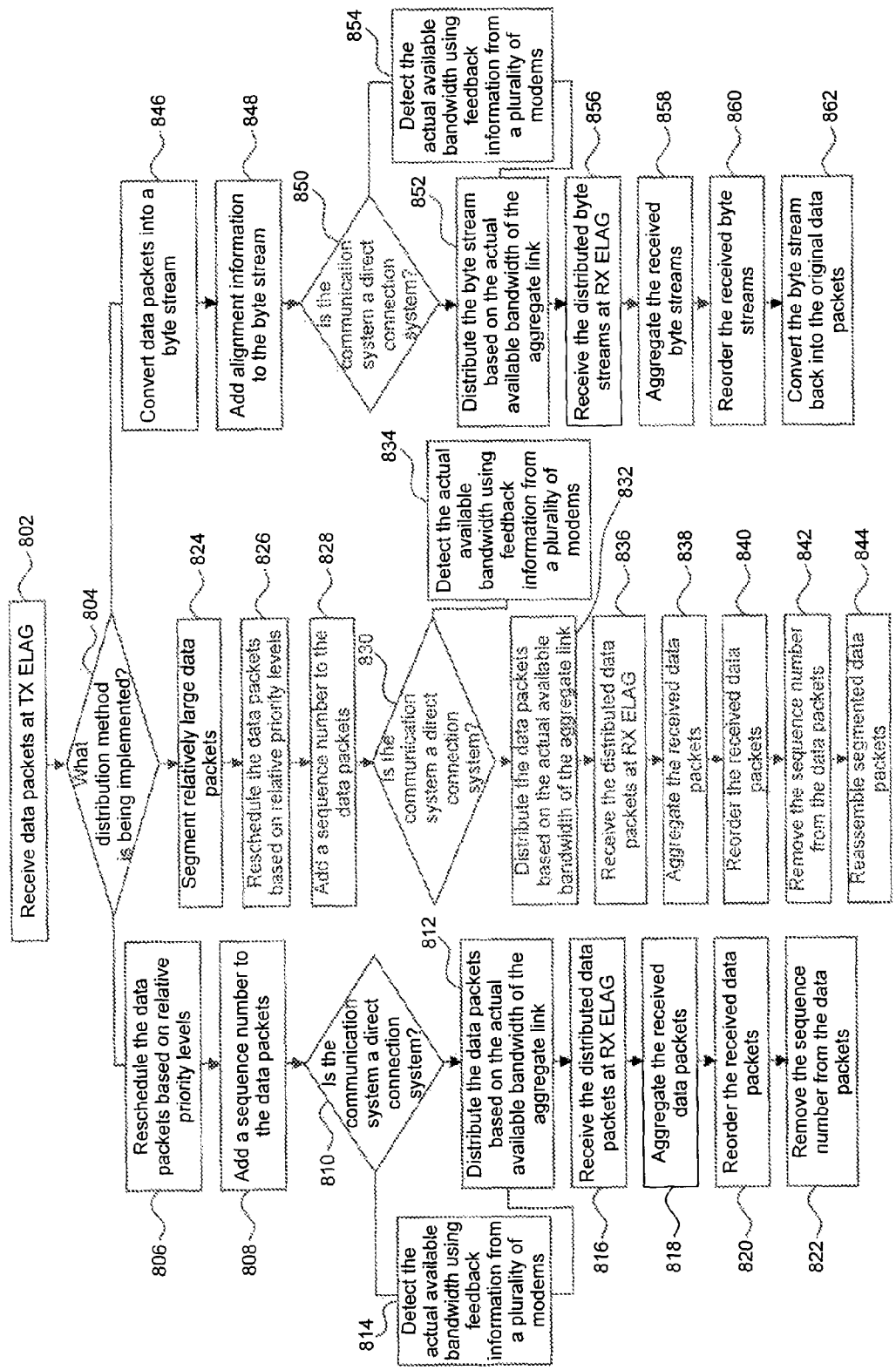
FIG. 8 is a flowchart of exemplary operational steps of performing enhanced link aggregation to achieve optimal aggregated link usage according to an exemplary embodiment of the present disclosure.

An Exemplary Method of Optimizing Aggregated Link Usage Using Enhanced Link Aggregation FIG. 8 is a flowchart of exemplary operational steps of performing enhanced link aggregation to achieve optimal aggregated link usage according to an exemplary embodiment of the present disclosure. The flowchart of FIG. 8 is described with reference to embodiments of FIGS. 1-7. However, a method 800 is not limited to these embodiments. The order of the steps in method 800 are not meant to be limiting, as at least a portion of the steps could be performed in a different order, or simultaneously, and still be within the scope and spirit of the disclosure.

Method 800 begins at step 802 where multiple data packets are received at an ELAG transmitter device, such as ELAG transmitter device 300, to provide an example.

In step 804, a decision is made as to whether the ELAG transmitter device is currently implementing a packet based distribution method, a segmented packet distribution method, or a byte based distribution method. If the ELAG transmitter device is implementing a packet based distribution method, then the method proceeds to step 806.

In step 806, the data packets are rescheduled based on the relative priority levels of the data packets. For example, the data packets may be rescheduled such that "high priority" packets are transmitted before "low priority" packets.

In step 808, a sequence number is added to the data packets.

In step 810, a decision is made as to whether the communication system in which the ELAG transmitter device is implemented is a direct connection communication system, such as communication system 100, to provide an example. If the communication system is a direct connection communication system, then the method proceeds to step 812.

In step 812, the data packets are logically distributed based on the actual available bandwidth of the aggregate link. For example, the data packets may be distributed based on a weighted round robin distribution technique. Additionally, the actual available bandwidth may be detected directly by the ELAG transmitter device, since the ELAG transmitter device is in direct connection with the aggregate link.

If however in step 810 the decision is made that the communication system is an indirect communication system, such as communication system 200, to provide an example, then the method proceeds to step 814.

In step 814, the actual available bandwidth is detected using feedback information from multiple modems, which are directly connected to each individual non-Ethernet link that comprises the aggregate link. As discussed above, the feedback information is used to detect and monitor the actual available bandwidth in indirect connection communication systems because the ELAG transmitter device is not directly connected to the aggregate link. Following step 814, the method proceeds back to step 812.

In step 816, the distributed data packets are received at an ELAG receiver device following transmission over the aggregate link.

In step 818, the received data packets are aggregated back into a single stream of data packets.

In step 820, if any rescheduling of the data packets was performed by the ELAG transmitter device, then the received data packets will be reordered to recreate their original ordering, using for example the sequence number.

In step 822, the sequence number is removed from the received data packets, such that the original data packets are thus reconstructed.

If however in step 804 the decision is made that the ELAG transmitter device is implementing a segmented packet distribution method, then the method proceeds to step 824.

In step 824, at least some of the data packets are segmented to further reduce latency within the communication system. For example, relatively large data packets may be segmented into smaller sized packets before transmission across the aggregate link, including adding segmentation overhead so that the smaller packets can be reassembled into the larger packet(s) at the receiver.

In step 826, the data packets are rescheduled based on the relative priority levels of the data packets.

In step 828, a sequence number is added to the data packets, so the data packets can be reorder if necessary at the receiver.

In step 830, a decision is made as to whether the communication system in which the ELAG transmitter device is implemented is a direct connection communication system, such as communication system 100, to provide an example. If the communication system is a direct connection communication system, then the method proceeds to step 832.

In step 832, the data packets are logically distributed based on the actual available bandwidth of the aggregate link. The actual available bandwidth may be detected directly by the ELAG transmitter device, since the ELAG transmitter device is in direct connection with the aggregate link.

If however in step 830 the decision is made that the communication system is an indirect communication system, such as communication system 200, to provide an example, then the method proceeds to step 834.

In step 834, the actual available bandwidth is detected using feedback information from multiple modems, which are directly connected to each individual non-Ethernet link that comprises the aggregate link. Following step 834, the method proceeds back to step 832.

In step 836, the distributed data packets are received at an ELAG receiver device following transmission over the aggregate link.

In step 838, the received data packets are aggregated back into a single stream of data packets.

In step 840, if any rescheduling of the data packets was performed by the ELAG transmitter device, then the received data packets will be reordered to recreate their original ordering.

In step 842, the sequence number is removed from the received data packets.

In step 844, relatively large data packets that may have been segmented are reassembled such that the original data packets are thus reconstructed, using for example the segmentation overhead.

If however in step 804 the decision is made that the ELAG transmitter device is implementing a byte based distribution method, then the method proceeds to step 846.

In step 846, the data packets are converted to byte streams. For example, the ELAG transmitter device may convert the data packets to byte streams using a generic framing procedure (GFP), or the like.

In step 848, alignment information is added to the data packets.

In step 850, a decision is made as to whether the communication system in which the ELAG transmitter device is implemented is a direct connection communication system, such as communication system 100, to provide an example. If the communication system is a direct connection communication system, then the method proceeds to step 852.

In step 852, the byte streams are logically distributed based on the actual available bandwidth of the aggregate link. The actual available bandwidth may be detected directly by the ELAG transmitter device, since the ELAG transmitter device is in direct connection with the aggregate link.

If however in step 850 the decision is made that the communication system is an indirect communication system, such as communication system 200, to provide an example, then the method proceeds to step 854.

In step 854, the actual available bandwidth is detected using feedback information from multiple modems, which are directly connected to each individual non-Ethernet link that comprises the aggregate link. Following step 854, the method proceeds back to step 852.

In step 856, the distributed byte streams are received at an ELAG receiver device following transmission over the aggregate link.

In step 858, the received byte streams are aggregated back into a single byte stream.

In step 860, if any rescheduling of the individual bytes was performed by the ELAG transmitter device, then the received byte streams will be reordered to recreate their original ordering.

In step 862, the byte stream is converted back into the original data packets.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. An enhanced link aggregation (ELAG) transmitter device, comprising:
    a packet interface configured to receive a plurality of data packets;
    a controller configured to segment and reschedule one or more data packets of the plurality of data packets and to add a sequence number to the one or more data packets; and
    a distributor configured to logically distribute the one or more segmented and rescheduled data packets across an aggregate link including a plurality of individual links, based on an actual available bandwidth of the aggregate link and in accordance with at least one of a packet based distribution scheme, a segmented packet distribution scheme, and a byte based distribution scheme, wherein the distributor is further configured to determine the actual available bandwidth of the aggregate link by continuously monitoring an actual available bandwidth of each of the plurality of individual links without suspending the distribution of the one or more segmented and rescheduled data packets across the aggregate link.

2. The ELAG transmitter device of claim 1, wherein the aggregate link comprises a plurality of Ethernet links that are connected to the ELAG transmitter device, and wherein the distributor is configured to determine the actual available bandwidth of the aggregate link by monitoring the plurality of Ethernet links.

3. The ELAG transmitter device of claim 1, further comprising:
a plurality of modem interfaces configured to receive feedback information from a plurality of modems connected to the aggregate link,
wherein the plurality of modem interfaces are connected to the plurality of modems via a plurality of fixed bandwidth links,
wherein the plurality of modems are configured to convert the one or more segmented and rescheduled data packets from a fixed bandwidth format to a variable bandwidth format,
wherein the aggregate link comprises a plurality of non-Ethernet links, and
wherein the feedback information is indicative of an actual available bandwidth of each of the plurality of non-Ethernet links.

4. The ELAG transmitter device of claim 3, wherein the distributor is configured to logically distribute the one or more segmented and rescheduled data packets across the aggregate link based on the feedback information.

5. The ELAG transmitter device of claim 1, wherein the controller is further configured to output unsegmented data packets of the plurality of data packets to the distributor, and wherein the distributor is further configured to distribute the unsegmented data packets across the aggregate link when at least one of the packet based distribution scheme and the byte based distribution scheme is implemented.

6. The ELAG transmitter device of claim 1, wherein the controller is configured to segment relatively large data packets into relatively small data packets when the segmented packet distribution scheme is implemented.

7. The ELAG transmitter device of claim 1, wherein the distributor is further configured to convert a stream of packets into a stream of bytes using a generic framing procedure when the byte based distribution scheme is implemented.

8. The ELAG transmitter device of claim 1, wherein the controller is configured to reschedule the one or more data packets when at least one of the one or more data packets is designated as having a priority level.

9. The ELAG transmitter device of claim 1, wherein the sequence number is indicative of an original order of each of the one or more data packets.

10. The ELAG transmitter device of claim 1, wherein the distributor is configured to distribute the one or more segmented and rescheduled data packets across the aggregate link using a weighted round robin distribution technique.

11. A communication system for achieving enhanced link aggregation (ELAG), comprising:
an aggregate link including a plurality of individual links;
an ELAG transmitter device, comprising:
a first controller configured to modify and reschedule one or more data packets; and
a distributor configured to logically distribute the one or more modified and rescheduled data packets across the aggregate link based on an actual available bandwidth of the aggregate link and in accordance with at least one of a packet based distribution scheme, a segmented packet distribution scheme, and a byte based distribution scheme, wherein the distributor is further configured to determine the actual available bandwidth of the aggregate link by continuously monitoring an actual available bandwidth of each of the plurality of individual links without suspending the distribution of the one or more modified and rescheduled data packets across the aggregate link; and
an ELAG receiver device, configured to receive the one or more modified and rescheduled data packets from the ELAG transmitter device over the aggregate link, comprising;
an aggregator configured to aggregate the one or more modified and rescheduled data packets into a single data stream based on control information contained within the one or more modified and rescheduled data packets and in accordance with the at least one of the packet based distribution scheme, the segmented packet distribution scheme, and the byte based distribution scheme; and
a second controller configured to reconstruct the one or more data packets from the single data stream.

12. The communication system of claim 11, wherein the aggregator is configured to aggregate the one or more modified and rescheduled data packets using an inverse of a distribution method implemented by the ELAG transmitter device.

13. The communication system of claim 11, wherein the second controller is configured to reconstruct the one or more data packets by examining at least one of a header, a sequence number, a segmentation overhead, and alignment information included within the one or more modified and rescheduled data packets.

14. The communication system of claim 13, wherein the sequence number is indicative of an original order of each of the one or more data packets.

15. The communication system of claim 11, further comprising:
a plurality of modem interfaces, included within the ELAG transmitter device, configured to receive feedback information from a plurality of modems connected to the aggregate link,
wherein the plurality of modem interfaces are connected to the plurality of modems via a plurality of fixed bandwidth links,
wherein the plurality of modems are configured to convert the one or more modified and rescheduled data packets from a fixed bandwidth format to a variable bandwidth format,
wherein the aggregate link comprises a plurality of non-Ethernet links, and
wherein the feedback information is indicative of an actual available bandwidth of each of the plurality of non-Ethernet links.

16. A method of performing enhanced link aggregation (ELAG) within a communication system, comprising:
receiving one or more data packets at an ELAG transmitter device;
implementing at least one of a packet based distribution scheme, a segmented packet distribution scheme, and a byte based distribution scheme;
adding a sequence number to the one or more data packets when at least one of the packet based distribution scheme and the segmented packet distribution scheme is implemented;

adding alignment information to the one or more data packets when the byte based distribution scheme is implemented;

segmenting at least one of the one or more data packets when the segmented packet distribution scheme is implemented;

converting the one or more data packets into a byte stream when the byte based distribution scheme is implemented;

rescheduling the one or more data packets based on a priority level of each of the one or more data packets;

detecting an actual available bandwidth of an aggregate link, including a plurality of individual links, by continuously monitoring an actual available bandwidth of each of the plurality of individual links; and logically distributing the one or more data packets across the aggregate link based on the actual available bandwidth of the aggregate link, wherein the detecting the actual available bandwidth of the aggregate link is performed without suspending the distributing of the one or more data packets across the aggregate link.

17. The method of claim 16, wherein the detecting the actual available bandwidth of the aggregate link includes monitoring one or more Ethernet links directly connected to the ELAG transmitter device.

18. The method of claim 16, further comprising:
receiving feedback information from a plurality of modems directly connected to the aggregate link, wherein the aggregate link comprises a plurality of non-Ethernet links that are indirectly connected to the ELAG transmitter device, and wherein the feedback information is indicative of an actual available bandwidth of the plurality of non-Ethernet links.

19. The method of claim 18, wherein the logically distributing includes distributing the one or more data packets across the aggregate link based on the feedback information.

20. The method of claim 16, wherein the logically distributing includes distributing the one or more segmented and rescheduled data packets across the aggregate link using a weighted round robin distribution technique.

21. The method of claim 16, further comprising:
receiving, at an ELAG receiver device, a plurality of data streams from the ELAG transmitter device over the aggregate link;

reordering the plurality of data streams based on priority information included within the plurality of data streams;

aggregating the plurality of data streams into a single data stream based on at least one of the sequence number, a segmentation overhead, and the alignment information included within the plurality of data streams; and reconstructing the one or more data packets from the single data stream in accordance with the distribution method implemented by the ELAG transmitter device.

* * * * *